United States Patent [19]

Hicks et al.

[11] Patent Number: 5,321,777
[45] Date of Patent: Jun. 14, 1994

[54] FIBRE MODULATORS

[75] Inventors: Andrew M. Hicks, Ipswich; Iain J. Wilkinson, Felixstowe; Nicholas E. Achurch, Woodbridge; Stephen Hornung, Diss, all of England

[73] Assignee: British Telecommunications public limited company, London, England

[21] Appl. No.: 842,380

[22] PCT Filed: Jul. 30, 1990

[86] PCT No.: PCT/GB90/01179
§ 371 Date: Mar. 27, 1992
§ 102(e) Date: Mar. 27, 1992

[87] PCT Pub. No.: WO91/02276
PCT Pub. Date: Feb. 21, 1991

[30] Foreign Application Priority Data

Jul. 31, 1989 [GB] United Kingdom ............... 8917454

[51] Int. Cl.$^5$ ............................................. G02B 26/02
[52] U.S. Cl. ......................................... 385/4; 385/43; 385/28; 385/1
[58] Field of Search .................. 359/237, 341; 385/1, 385/7, 4, 39, 43, 28

[56] References Cited

U.S. PATENT DOCUMENTS

| Re. 33,296 | 8/1990 | Stowe et al. ............... 385/15 |
| 3,645,603 | 2/1972 | Smith ........................ 385/1 |
| 3,756,690 | 9/1973 | Borrelli et al. ............ 385/1 |
| 4,268,116 | 5/1981 | Schmadel et al. ........... 385/1 |
| 4,342,907 | 8/1982 | Macedo et al. ............. 250/350 |
| 4,725,124 | 2/1988 | Taylor ...................... 385/4 |
| 4,763,977 | 8/1988 | Kawasaki et al. ........... 385/43 |

FOREIGN PATENT DOCUMENTS

| 0284382 | 9/1988 | European Pat. Off. . |
| 2930454 | 2/1981 | Fed. Rep. of Germany . |
| 2613844 | 1/1988 | France . |
| 84/01835 | 5/1984 | PCT Int'l Appl. . |
| 1460211 | 12/1976 | United Kingdom . |
| 2079932 | 1/1982 | United Kingdom . |
| 2190211 | 11/1987 | United Kingdom . |
| 2207254 | 1/1989 | United Kingdom . |

OTHER PUBLICATIONS

Applied Physics Letters, vol. 30, No. 2, Jan. 15, 1977, American Institute of Physics, D. F. Nelson et al.: "Vibration-induced modulation of fiberguide transmission", pp. 94–96.
Patent Abstracts of Japan, vol. 6, No. 51, (P-108) (929), Apr. 6, 1982 & JP, A, 56164305 (Nippon Denshin Denwa Kosha) Dec. 17, 1981.
IBM Technical Disclosure Bulletin, vol. 16, No. 8, Jan. 1974 K. Kaser et al.: "Push-buttom switches for optical fibres" p. 2452.
Fernseh-Und Kino-Technik, vol. 40, No. 7, 1986, R. Herber: "Faseroptische Mikrophone" pp. 309–312.
Applied Physics Letters, vol. 35, No. 12, Dec. 15, 1979, American Institute of Physics, S. K. Sheem et al.: "Polarization effects on single-mode optical fiber sensors" pp. 924–917.

Primary Examiner—Ian J. Lobo
Attorney, Agent, or Firm—Nixon & Vanderhye

[57] ABSTRACT

A modulation assembly includes a fibre having a drawn tapered portion, and apparatus for applying a perturbation to the tapered portion to vary the percentage transmission through the fibre.

21 Claims, 1 Drawing Sheet

FIBRE MODULATORS

This invention relates to modulation techniques for optical communication systems, and in particular to modulation of light guided in an optical fibre.

In many instances, it is desirable to be able to modulate light within an optical fibre, without conducting light from the fibre through a separate modulation element. One such technique, for providing a clip-on supervisory channel, is disclosed in the specification of our copending patent application 8909944.4, in which the preferred embodiment comprises a small radius mandrel mounted on a loudspeaker coil, the mandrel impinging on an optical fibre to impart transient deformation to the fibre in accordance with the coil movement. This provides amplitude modulation of the light in the fibre, by virtue of differential losses from the fibre dependent upon the deformation.

A significant problem within an optical communication network is the provision of flexibility points at which expansion, or rearrangement, of the network can subsequently be made. For flexibility, it is desirable to maximise the number of potential coupling or tapping points. This is not possible if there is significant loss at the tapping points not utilised.

The aim of the present invention is to provide in-fibre modulation, and also to provide low-loss potential tapping points.

The present invention provides an optical fibre assembly comprising an optical fibre having a suspended tapered portion, and means for applying a perturbation to the tapered portion to vary the percentage transmission through the fibre, wherein the assembly is such that, in use, the perturbation applying means distorts the waveguide geometry of the tapered portion causing coupling of an optical beam carried by the tapered portion into higher order bound modes.

Preferably, the suspended tapered portion of the optical fibre is supported, under tension, between two support members.

Advantageously, the tapered portion comprises a fibre tapered by heating and drawing, the minimum radius of the tapered portion being 20 microns. Alternatively, the tapered portion comprises a fused coupler.

Preferably, the perturbation applying means comprises a vibratile member, such as a piezo-electric device. The vibratile member may impart a lateral deformation, or changes in tension, to the tapered portion.

The invention also provides a method of regulating the transmission power through an optical fibre, the method comprising the steps of applying a perturbation to a suspended tapered portion of the fibre, whereby the waveguide geometry of the tapered portion is distorted causing, in use, coupling of the modes of an optical beam carried by the tapered portion into higher order bound modes.

The invention will now be described in greater detail, by way of example, with reference to the accompanying drawings, in which.

Figure 1:
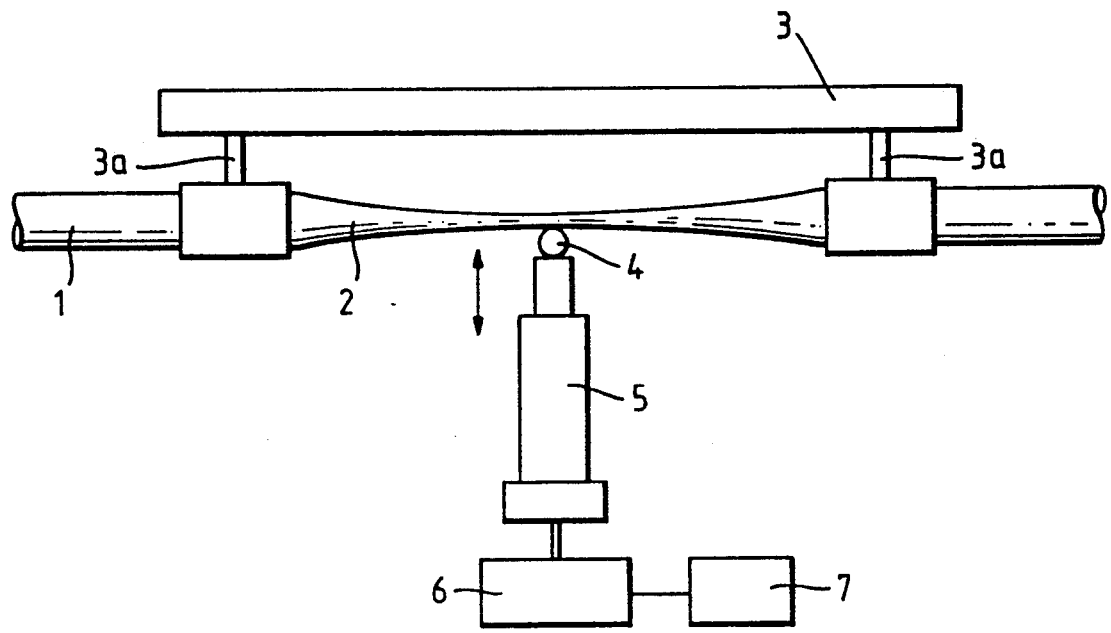
FIG. 1 illustrates an embodiment of the invention in which a tapered fibre is subjected to lateral deformation.

Referring to the drawings, FIG. 1 shows an optical fibre 1 which carries an optical beam such as a CW laser beam. A portion 2 of the fibre 1 that has previously been tapered, for example to a minimum radius of about 20 microns (although larger or smaller minimum radii are possible), is supported by a substrate 3 having arms 3a attached to the fibre, for example by glue or cement, at each side of the tapered portion, so that the tapered portion is suspended between the arms. It has been found that a suitable tapered portion 2, having an overall reduced diameter length of about 27 mm, can be produced by heating and drawing a standard optical fibre at 1700° C. The insertion loss of such a tapered portion 2 is typically 0.05 dB. The supporting substrate 3 may be of any suitable material, but is preferably made of silica or some other material having a thermal expansion matched to that of the fibre 1.

The tapered portion 2 of the fibre 1 is positioned adjacent to a modulation means that operates by deforming the tapered portion of the fibre by a greater or lesser extent causing a greater or lesser power loss from the fibre. In the embodiment shown in FIG. 1, the deformation is achieved by physical contact of a vibratile member 4 with the tapered portion 2 of the fibre 1 to produce a lateral deformation, but analagous lateral deformation could also be produced by electrostatic means. In the FIG. 1 embodiment the vibratile member 4 is constituted by a pin mounted on a piezo-electric crystal 5, although alternative structures such as a shaped piezo-electric crystal could equally well be used. The piezo-electric crystal 5 is driven by a signal generator 6 that is controlled by a variable voltage driver unit 7. For drive voltages of the order of 3 to 40 volts a longitudinal movement of the piezo-electric crystal 5 of typically 5 to 15 microns is obtained.

For efficient modulation, it is desirable to drive the piezo-electric crystal 5 so that it vibrates at, or close to, its resonant frequency. The frequency at which the piezo-electric crystal 5 resonates for a given material is dependent upon the piezo thickness and diameter. This resonant frequency is used, in a manner described below, as a carrier frequency for modulation with an information signal. The carrier (resonant) frequency for a piezo-electric crystal 5 can be varied slightly (by up to about 5 KHz) by varying the force of the vibratile member 4 against the fibre 1.

With the tapered portion 2 of the fibre 1 oscillating at the resonant frequency of the piezo-electric crystal 5, due to driven contact with the vibratile member 4, a harmonic oscillating amplitude optical output is produced in the output optical beam. This output constitutes a carrier frequency which may be modulated with an information signal by modulating the oscillation of the vibratile member 4. A simple amplitude modulation superimposed on the oscillation of the voltage of the driver unit 7 will cause the amplitude of the piezo-electric vibration to be likewise modulated, which in turn will modulate the degree of bending that the piezo-electric movement imposes on the tapered portion 2 of the fibre 1, and this will result in a corresponding amplitude modulation superimposed on the output optical beam. An alternative modulation technique is to vary the frequency of the piezo-electric vibration, for example within +5 KHz of the resonant frequency of the piezo-electric crystal 5. This may be done by frequency modulating the voltage oscillations of the driver unit 7. Both frequency modulation and amplitude modulation of the tapered portion 2 may be utilised simultaneously. Other modulation techniques may also be employed.

Modulation in the tapered portion 2 of the fibre 1 is caused by the loss in this portion which results from deformation by the vibratile member 4. If we neglect the effect of the core of the tapered portion 2 of the fibre 1, it can be considered as a strongly guided, multimoded waveguide with a normalised frequency, $V \simeq 100$, its bound modes being guided by the cladding-air interface. The taper is sufficiently slight that only the $HE_{11}$ mode is excited.

In operation, a deformation is introduced into the tapered portion 2 of the fibre 1 by activating the vibratile member 4. This distorts the waveguide geometry, causing coupling to higher order bound modes. These higher order modes become leaky modes at the far end of the tapered portion 2 of the fibre 1, and only light in the $HE_{11}$ local mode is guided back into the fibre core. This, therefore, provides a method of amplitude modulating a signal through the tapered portion 2 of the fibre 1. By coupling more light into high order modes, the insertion loss of the tapered portion 2 can be increased.

Figure 2:
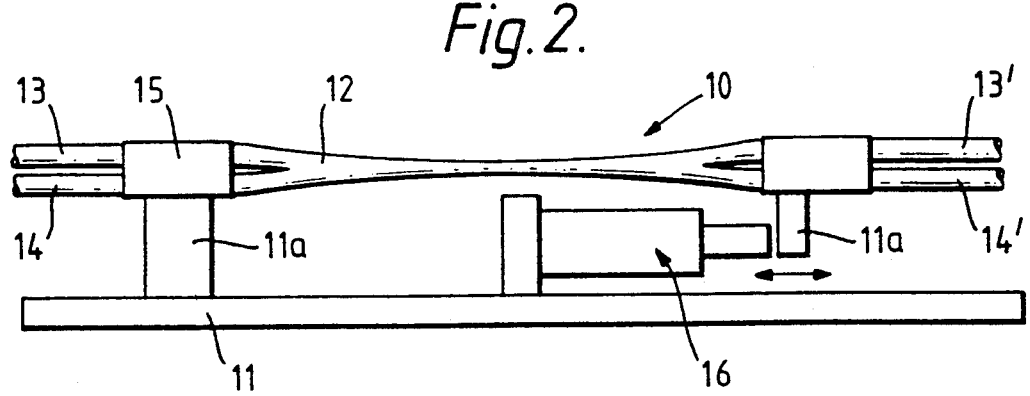
FIG. 2 shows an embodiment in which a fused coupler is subjected to varying longitudinal tension.

In the embodiment of FIG. 1, the fibre 1 is deformed laterally in order to provide a loss-modulated output signal. Longitudinal deformation, i.e. tension may also be utilised. In this case, the sensitising of the fibre 1 to the tension changes is preferably by way of a fibre coupler. FIG. 2 illustrates a system utilising a fused or twisted fibre coupler, but an analagous technique can be applied to other sensitised fibres.

Referring to FIG. 2, a fused (or twisted and fused) fibre coupler 10 is mounted through silica channels 15 and between arms 11a attached to a substrate block 11. The fused coupler 10 is formed by fusing two optical fibres, these fibres being denoted by the reference numerals 13 and 14 on one side of the coupler, and by the reference numerals 13' and 14' on the other side of the coupler. The substrate block 11 incorporates a piezoelectric device 16 that is driven in a manner similar to that described with reference to FIG. 1. The fused coupler 10 is fabricated under tension such that light is coupled straight through along the tapered portion 12 from the fibre 13 to the fibre 13'. Changes in the tension of the coupler 10, whether by extension or contraction, will change the coupling ratio so that some of the light will be coupled into the fibre 14', which may be regarded as an auxilliary fibre. Thus, a piezo-electric vibration transferred longitudinally to the fibre coupler 10 will provide a cyclical amplitude-modulated output signal in the transmission fibre 13' due to cyclic changes in the coupling ratio. An inverse modulation appears on the auxilliary fibre 14', and this too may be utilised, especially if the initial coupling ratio is set to non-zero, for example to 50%. Frequency-modulated or amplitude-modulated information signals may be superimposed on the piezo-electric (or other) vibration in a manner similar to that previously described to provide a corresponding modulation on the output signal.

A modification to the embodiment of FIG. 2 is to provide a means for adjusting the basic tension of the coupler 10. In this way, couplers located in a transmission line at various access points may be tensioned so that there is no net coupling out from the main transmission fibre. When it is desired to provide, either on a temporary or permanent basis, an expansion of the network, the coupler tension is adjusted so that a desired degree of tapping is provided. Alternatively, the relative power distribution between branches may be varied in order to increase the capacity of one of the branches by varying the tension. The change in tension may be brought about by longitudinal movement of the support arms 11a, or by bending the assembly with the coupler 10 on the inside of the bend.

Figure 3:
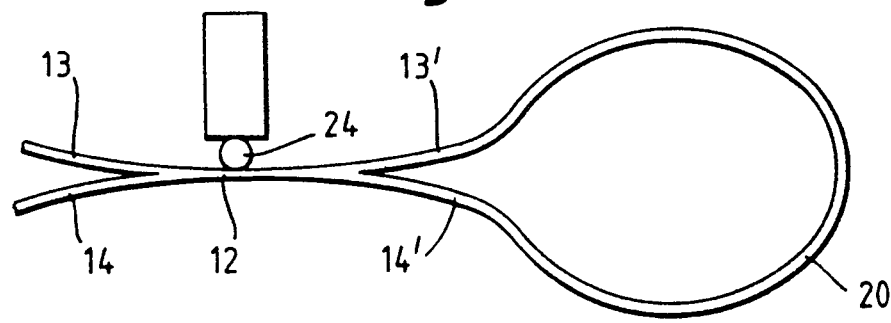
FIG. 3 shows a modified form of the embodiment shown in FIG. 2 in which a fused coupler is connected to a reflector loop.

FIG. 3 shows a modification of the system shown in FIG. 2. In this modification a loop reflector 20 is contiguous with the fibres 13' and 14'. In practice, the device of FIG. 3 is formed from a single fibre which is folded back on itself to form the loop 20. The fused coupler 10 is then formed in the normal manner by heating and then drawing the fibres, thereby defining the fibres 13 and 14 on one side of the coupler, and the fibres 13' and 14' on the other side of the coupler.

The fused coupler 10 is arranged to have a 50/50 coupling ratio, so that, when there is no distortion of the tapered portion 12 of the coupler, all the light passing along the fibre 13 is reflected back into the same fibre, so that the loop reflector 20 acts as a perfect mirror.

When the tapered portion 12 is distorted by modulation, additional loss mechanisms come into play due to changes in the coupling ratio of the coupler 10. A vibratile member 24 (similar to the vibratile member 4 of the FIG. 1 embodiment) is provided for deforming the tapered portion 12 of the coupler 10. The changes in the coupling ratio mean that not all the light is coupled back into the fibre 13 after it has travelled around the loop 20, some of the light being coupled into the fibre 14. The fibre 14 has a terminator to prevent light coupled into this fibre being reflected back into the tapered portion 12. Because the signal passes along the tapered portion 12 twice the depth of modulation is increased.

Modulation by lateral deformation as shown in FIGS. 1 and 3 is preferable to the longitudinal deformation modulation method of FIG. 2, because it is easier to achieve, and higher frequencies of modulation are possible.

Modulators constructed in accordance with the invention can work with carrier frequencies of up to 3 MHz and bandwidths of 30 KHz. A number of channels can be carried on a single fibre using piezo devices operating at different frequencies, the channels being recovered by electrical filtering.

An advantage of the embodiment of FIG. 3 is that modulators of this type can be used as customer premises transmitters in a TPON (telephony on the passive optical network) system. Thus, expensive and potentially dangerous lasers do not have to be provided at customers premises, thereby reducing the cost of a TPON system and making it safer.

The taper of the single fibre of the embodiment of FIG. 1 may also be formed mechanically, and possibly asymmetrically. Further sensitisation could be achieved by etching a grating on to the tapered portion 2.

We claim:

1. An optical signal modulator formed by an optical fibre assembly comprising:
    an optical fibre for carrying the optical signal to be modulated and having a tapered portion suspended between two support points without any intermediate support distributed therealong, and
    means for applying a modulation signal perturbation directly to the suspended tapered portion to vary the percentage transmission through the fibre by distorting the waveguide geometry of the suspended tapered portion and thereby causing coupling of optical signal mode carried by the tapered portion into higher order bound modes in accordance with said modulation signal.

2. An assembly as claimed in claim 1, wherein the suspended tapered portion of the optical fibre is supported, under tension, between two support members.

3. An assembly as claimed in claim 1, wherein the tapered portion comprises a fibre that has been tapered by heating and drawing.

4. An assembly as claimed in claim 1 wherein the minimum radius of the tapered portion is 20 microns.

5. An assembly as claimed in claim 1 wherein the tapered portion comprises a fused coupler.

6. An assembly as claimed in claim 5, wherein the fused coupler is formed from two fibres.

7. An assembly as claimed in claim 6, wherein the two fibres have been twisted together.

8. An assembly as claimed in claim 5 wherein a reflector loop is contiguous with the fused coupler.

9. An assembly as claimed in claim 8, wherein the fused coupler and reflector loop are formed from a single fibre.

10. An assembly as claimed in claim 1 wherein the perturbation applying means comprises a vibratile member.

11. An assembly as claimed in claim 10, wherein the vibratile member imparts a lateral deformation to the tapered portion.

12. An assembly as claimed in claim 10, wherein the vibratile member imparts changes in tension to the tapered portion.

13. An assembly as claimed in claim 10, wherein the vibratile member comprises a piezo-electric device.

14. An assembly as claimed in claim 1, wherein the tapered portion is further sensitised by the provision of an etched grating on its surface.

15. An optical fibre switch assembly comprising:
a fused fibre coupler having two optical fibres fused together along an elongated axially-directed longitudinal dimension including a tapered portion suspended under tension between two support points without any intermediate support distributed therealong, the fused fibre coupler being subject to longitudinally directed tension forces, and
means for varying the longitudinal tension of the coupler to change the coupling ratio between the fibres of the coupler to switch operation of a branch line connected to the coupler.

16. A method of regulating the transmission of optical signal power through an optical fibre, the method comprising the step of:
applying a perturbation directly to a tapered portion of the fibre suspended between two support points without any intermediate support distributed therealong wherein the waveguide geometry of the tapered portion is distorted causing, in use, coupling of optical signal modes carried by the tapered portion into higher order bound signal modes.

17. An optical signal modulator comprising:
a signal generator source of modulated carrier frequency electrical signals;
an optical fibre carrying an optical signal to be modulated and having a tapered portion freely suspended in tension between two support points; and
modulating means coupled to impart mechanical movement to said freely suspended portion in response to said modulated carrier frequency electrical signals.

18. An optical signal modulator as in claim 17 wherein said modulating means comprises a piezoelectric crystal driving a vibratile member in direct contact with the freely suspended portion of said fibre.

19. An optical signal modulator as in claim 17 wherein said modulating means comprises a piezoelectric crystal coupled to move at least one of said two support points and thereby change the tension forces acting on the freely suspended portion of said fibre.

20. An optical signal modulator as in claim 17 wherein said freely suspended portion of said fibre comprises part of a fused optical fibre coupler.

21. An optical signal modulator as in claim 20 wherein said fused optical fibre coupler is formed by a single fibre looped back on itself to form an optical signal mirror.

* * * * *